United States Patent
Lee et al.

(10) Patent No.: US 11,122,415 B2
(45) Date of Patent: Sep. 14, 2021

(54) METHOD AND DEVICE USING NETWORK SLICING IN MOBILE COMMUNICATION SYSTEM

(71) Applicant: Samsung Electronics Co., Ltd., Suwon-si (KR)

(72) Inventors: Hoyeon Lee, Suwon-si (KR); Youngkyo Baek, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/379,598

(22) Filed: Apr. 9, 2019

(65) Prior Publication Data

US 2019/0313236 A1   Oct. 10, 2019

(30) Foreign Application Priority Data

Apr. 9, 2018 (KR) .................. 10-2018-0041237

(51) Int. Cl.
| | |
|---|---|
| *H04W 48/18* | (2009.01) |
| *H04W 8/08* | (2009.01) |
| *H04W 72/04* | (2009.01) |
| *H04W 80/10* | (2009.01) |
| *H04W 88/02* | (2009.01) |
| *H04W 88/10* | (2009.01) |

(52) U.S. Cl.
CPC .............. *H04W 8/08* (2013.01); *H04W 48/18* (2013.01); *H04W 72/0493* (2013.01); *H04W 80/10* (2013.01); *H04W 88/023* (2013.01); *H04W 88/10* (2013.01)

(58) Field of Classification Search
CPC ... H04W 8/08; H04W 48/18; H04W 72/0493; H04W 80/10; H04W 88/023; H04W 88/10
See application file for complete search history.

(56) References Cited

U.S. PATENT DOCUMENTS

| | | |
|---|---|---|
| 2017/0303259 A1 | 10/2017 | Lee et al. |
| 2018/0199279 A1 | 7/2018 | Baek et al. |
| 2019/0223093 A1* | 7/2019 | Watfa ............... H04W 48/18 |

(Continued)

FOREIGN PATENT DOCUMENTS

| | | |
|---|---|---|
| KR | 10-2018-0081969 A | 7/2018 |
| WO | 2017/113100 A1 | 7/2017 |

OTHER PUBLICATIONS

ZTE, et al., "23.501 P-CR: Network Slicing Update for supporting standalone NSSF", SA WG2 Meeting #122, Jun. 20, 2017, 13 pages, S2-174249.

(Continued)

*Primary Examiner* — Brian P Cox

(57) ABSTRACT

According to the disclosure, a communication method using a network slice by an access and mobility management function (AMF) comprises receiving one of subscribed single-network slice selection assistance information (S-NSSAI) or network slice selection policy (NSSP) information, requesting and receiving the other, non-received information of the subscribed S-NSSAI or the NSSP information, and transmitting a first message including the received subscribed S-NSSAI and the received NSSP information to a user equipment (UE).

4 Claims, 15 Drawing Sheets

(56) References Cited

U.S. PATENT DOCUMENTS

2019/0268895 A1\* 8/2019 Keller ................. H04W 72/048
2020/0154389 A1\* 5/2020 Karampatsis ....... H04L 41/0893

OTHER PUBLICATIONS

Nokia, et al., "TS 23.501 OI#32: Triggering of NSSP update ENs removal", 3GPP TSG SA WG2 Meeting #124, Nov. 27-Dec. 1, 2017, 4 pages, S2-178543.
"3rd Generation Partnership Project; Technical Specification Group Services and System Aspects; Procedures for the 5G System; Stage 2 (Release 15)", 3GPP TS 23.502 V15.1.0 (Mar. 2018), 285 pages.
International Search Report and Written Opinion of the International Searching Authority dated Jul. 2, 2019 in connection with International Patent Application No. PCT/KR2019/004217, 10 pages.
Supplementary European Search Report dated Feb. 9, 2021 in connection with European Application No. 19785783.2, 7 pages.
Qualcomm Incorporated, "Policy ID definition and handling proposal to split UE policies in sections," 3GPP TSG-SA WG2 Meeting #125, S2-180564, Gothenburg, Sweden, Jan. 22-26, 2018, 4 pages.
Lenovo et al., "UE Policy configuration (23.502)," SA WG2 Temporary Document, S2-177243 (revision of S2-), SA WG2 Meeting #123, Oct. 23-27, 2017, Ljubljana, Slovenia, 7 pages.

\* cited by examiner

METHOD AND DEVICE USING NETWORK SLICING IN MOBILE COMMUNICATION SYSTEM

CROSS-REFERENCE TO RELATED APPLICATION

This application is based on and claims priority under 35 U.S.C. § 119 to Korean Patent Application No. 10-2018-0041237, filed on Apr. 9, 2018, in the Korean Intellectual Property Office, the disclosure of which is incorporated by reference herein in its entirety.

BACKGROUND

1. Field

The disclosure relates to methods and devices for using network slicing in mobile communication systems.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

5G network technology is a successor to 4G LTE mobile communication technology and seeks an end-to-end (E2E) system in which all targets are highly integrated over a network providing access in a wired or other various schemes. To that end, ITU-R, ITU-T, NGMN, 3GPP or other standardization organizations are designing brand-new clean slate-type systems and network architectures to implement wireless and wired network technology featuring high performance, low latency, and high availability.

A most prominent feature of 5G networks lies in adopting network slicing for radio access networks (RANs) and core networks (CNs). This is intended for bundling up network resources and network functions into a single independent network slice depending on individual services, allowing for application of network system function and resource isolation, customization, independent management and orchestration to mobile communication network architectures. The use of such network slicing enables offering 5G services in an independent and flexible way by selecting and combining 5G system network functions according to services, users, business models, or such references.

The slice over a 5G network provides customized 5G network services by combining control plane (CP) and user plane (UP) network functions for 5G services necessary for a particular service over a core network and a radio access network.

The above information is presented as background information only to assist with an understanding of the disclosure. No determination has been made, and no assertion is made, as to whether any of the above might be applicable as prior art with regard to the disclosure.

SUMMARY

Embodiments of the disclosure define a method of providing user equipment (UE) configuration information to a UE in a 5G-based network slicing structure.

Embodiments of the disclosure define a method of searching for an adequate network entity when a UE accesses a 5G network.

Embodiments of the disclosure define a session managing method considering network slicing.

According to an embodiment of the disclosure, a method of processing a control signal in a wireless communication system includes receiving a first control signal from a network entity, processing the received first control signal, and transmitting a second control signal generated based on the processing to the network entity or another network entity.

According to an embodiment of the disclosure, there may be provided a communication method using a network slice by an access and mobility management function (AMF), comprising receiving one of subscribed single-network slice selection assistance information (S-NSSAI) or network slice selection policy (NSSP) information, requesting and receiving the other, non-received information of the subscribed S-NSSAI or the NSSP information, and transmitting a first message including the received subscribed S-NSSAI and the received NSSP information to a user equipment (UE).

According to an embodiment of the disclosure, requesting the other, non-received information of the subscribed S-NSSAI or the NSSP information may be performed when updating configuration information stored in the UE is determined to be required.

According to an embodiment of the disclosure, the first message may be a message to instruct the UE to update configuration information.

According to an embodiment of the disclosure, the subscribed S-NSSAI may be received from unified data management (UDM).

According to an embodiment of the disclosure, the NSSP information may be received from a policy control function (PCF).

According to an embodiment of the disclosure, there may be provided a communication method using a network slice by a UE, comprising, based on that first S-NSSAI is included in configured S-NSSAI and is not included in NSSP information, transmitting a configuration information request message related to the first S-NSSAI to an AMF and receiving a configuration information response message related to the first S-NSSAI from the AMF.

According to an embodiment of the disclosure, the configuration information response message related to the first S-NSSAI may include latest NSSP information related to the first S-NSSAI.

According to an embodiment of the disclosure, the latest NSSP information may be obtained from a PCF or a user data repository (UDR).

According to an embodiment of the disclosure, the communication method may further comprise updating the UE's configuration information using the received latest NSSP information.

According to an embodiment of the disclosure, there may be provided a communication method using a network slice by a first AMF, comprising receiving a UE context transfer message from a second AMF, transmitting a message responsive to the UE context transfer message to the second AMF and receiving registration rejection-related information and target AMF-related information from the second AMF.

According to an embodiment of the disclosure, the communication method may further comprise registration success-related information from the target AMF.

According to an embodiment of the disclosure, the communication method may further comprise deleting a UE context based on the registration success-related information received from the target AMF and the target AMF-related information received from the second AMF.

According to an embodiment of the disclosure, there may be provided a communication method using a network slice by an AMF, comprising receiving a session establishment request message including S-NSSAI from a UE, determining validity of the S-NSSAI, and performing a session establishment process based on a result of the determination.

According to an embodiment of the disclosure, when allowed NSSAI stored in the AMF does not include the S-NSSAI, the session establishment process may include transmitting a response message indicating rejection of session establishment to the UE.

According to an embodiment of the disclosure, when allowed NSSAI stored in the AMF does not include the S-NSSAI, the session establishment process may include transmitting a network function discovery request message to discover an SMF supporting default S-NSSAI to the NRF.

According to an embodiment of the disclosure, when allowed NSSAI stored in the AMF does includes the S-NSSAI, the session establishment process may include transmitting a network function discovery request message to discover an SMF supporting valid S-NSSAI to the NRF.

According to an embodiment of the disclosure, there may be provided a method of a user equipment (UE) using a network slice, the method comprising transmitting, to an access and mobility management function (AMF), a policy request message, receiving, from the AMF, a response message including policy information, and updating policy information stored in the UE based on the policy information included in the response message.

According to an embodiment of the disclosure, there may be provided a method of an access and mobility management function (AMF) using a network slice, the method comprising receiving, from a user equipment (UE), a policy request message, transmitting, to a policy control function (PCF), a request message including the received policy request message, receiving, from the PCF, a first response message including a policy information related to the UE, and transmitting, to the UE, a second response message including the policy information related to the UE.

According to an embodiment of the disclosure, there may be provided a user equipment (UE), the UE comprising a transceiver, and at least one processor, coupled with the transceiver, and configured to transmit, to an access and mobility management function (AMF), a policy request message, receive, from the AMF, a response message including policy information, and update policy information stored in the UE based on the policy information included in the response message.

According to an embodiment of the disclosure, there may be provided an apparatus for an access and mobility management function (AMF) using a network slice, the apparatus comprising a transceiver, and at least one processor, coupled with the transceiver, and configured to receive, from a user equipment (UE), a policy request message, transmit, to a policy control function (PCF), a request message including the received policy request message, receive, from the PCF, a first response message including a policy information related to the UE, and transmit, to the UE, a second response message including the policy information related to the UE.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1A:
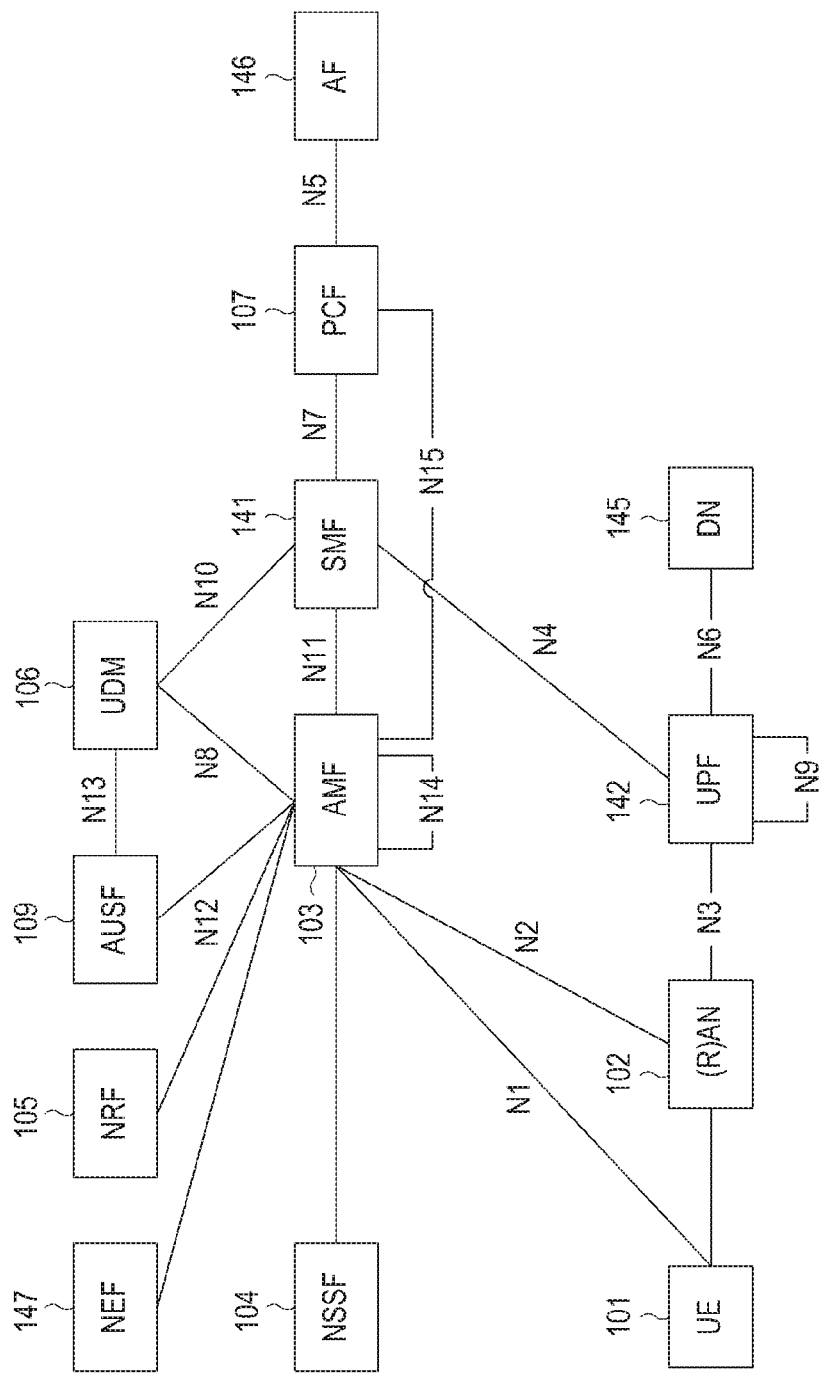
FIG. 1A illustrates a 5G system structure according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. The terms as used herein are defined considering the functions in the disclosure and may be replaced with other terms according to the intention or practice of the user or operator. Therefore, the terms should be defined based on the overall disclosure.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, the disclosure adopts terms and names defined in 5G system standards. However, the disclosure is not limited by such terms and names and may be likewise applicable to systems conforming to other standards.

The description of embodiments of the disclosure focuses primarily on 3GPP communication standards, but the subject matter of the disclosure may also be applicable to other communication systems with a similar technical background with minor changes without significantly departing from the scope of the disclosure, and this may be so performed by the determination of those skilled in the art to which the disclosure pertains.

According to an embodiment of the disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

General communication systems have been designed independently from applications provided on the communication systems. The user accesses the communication system and then selects an application which the user intends to use and receives service. With the development of network function virtualization (NFV), software defined network (SDN) or such techniques, communication technology evolves to be able to configure a network slice optimized for the nature of each application over a single huge network.

One network slice is configured of an end-to-end (E2E) logical network including a user equipment (UE) and an opposite node (an opposite UE or an opposite application server).

The user may access a network specified for the application which the user is using and receive a service. In other words, the user's UE may simultaneously access one or more network slices.

The 3GPP which is in charge of mobile communication standardization has completed the 5G phase I standard which encompasses network slicing functions. Rel-16 goes on with the network slicing phase II standard.

Figure 1B:
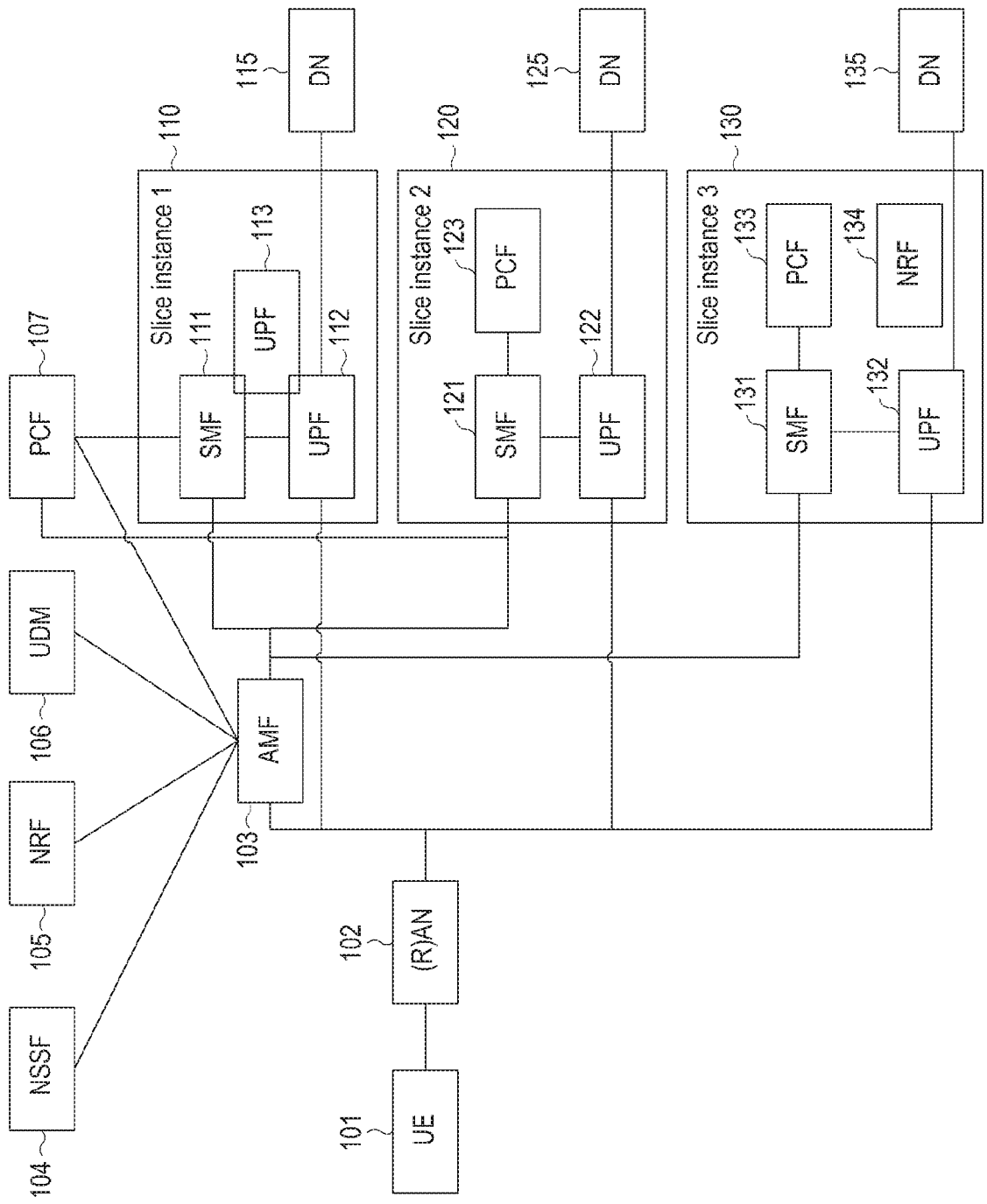
FIG. 1B illustrates a 5G network slice structure according to an embodiment of the disclosure.

FIG. 1A illustrates a 5G system structure. FIG. 1B illustrates a 5G network slice structure. Hereinafter, the overall 5G system is described and then network slices are described with reference to FIGS. 1A and 1B.

Referring to FIG. 1A, a 5G system structure may include, as network elements, a user equipment (UE) 101, a radio access network ((R)AN) 102, a data network (DN) 145, and a plurality of network functions (NFs) inside a core network (CN).

In the 5G system architecture, functions, connection points, or protocols may be defined for the plurality of NFs. The 5G system structure may be shown with reference points indicating service-based interfaces corresponding to the NF(s) and reference points indicating interactions present among the NFs.

The plurality of network functions (NFs) may include an authentication server function (AUSF) 109, an access and mobility management function (AMF) 103, a network exposure function (NEF) 147, a network function repository function (NRF) 105, a policy control function (PCF) 107, a session management function (SMF) 141, a unified data management (UDM) 106, a user plane function (UPF) 142, an application function (AF) 146, and a network slice selection function (NSSF) 104.

In the disclosure, the AMF, SMF, PCF, and UPF may play a key role in establishing a UE-requested protocol data unit (PDU) session and managing traffic between the UE and the DN.

The UE 101 may be implemented in various forms. For example, as disclosed herein, the UE may be, e.g., a mobile phone, a smartphone, a laptop computer, a digital broadcast terminal, a portable digital assistant (PDA), a portable media player (PMP), or a navigation device. As disclosed herein, the UE may include an electronic device. The reference point between the UE 101 and the AMF 103 is defined as N1.

The (R)AN 102 represents a base station that uses new radio access technology (RAT). For example, the AN 102 may be a base station with 3GPP access technology or a base station with non-3GPP access technology, such as Wi-Fi. The reference point between the AN 102 and the AMF 103 is defined as N2, and the reference point between the AN and the UPF 142 is defined as N3.

The DN 145 may deliver PDUs, which are to be sent on downlink, to the UPF 142 or receive PDUs from the UE 101 via the UPF 142. The reference point between the DN 145 and the UPF 142 is defined as N6.

The AMF 103 provides access and mobility management functionality independently of access technology, i.e., per UE 101. The reference point between the AMF 103 and the UE 101 is defined as N1. The reference point between the AMF 103 and the (R)AN 102 is defined as N2. The reference point between the AMF 103 and the UDM 106 is defined as N8. The reference point between the AMF 103 and the AUSF 109 is defined as N12. The reference point between the AMF 103 and the SMF 141 is defined as N11.

The SMF 141 provides session management functionality in which, when one UE 101 has several sessions, a different SMF is assigned per session to manage the sessions. The UPF 142 is set up using control signal information produced by the SMF 141. The N4 reference point is defined for the UPF 142 to be able to report its state to the SMF 141. The reference point between the SMF 141 and the AMF 103 is defined as N11. The reference point between the SMF 141 and the UDM 106 is defined as N10. The reference point between the SMF 141 and the PCF 105 is defined as N7. The reference point between the SMF 141 and the AMF 103 is defined as N11.

For example, each UE 101 may connect to one AMF 103. For the SMF 141, one UE 101 may have several sessions, and thus, a different SMF 111, 121, or 131 may be provided for each session.

To ensure quality of service (QoS), the AF 146 provides information about packet flow to the PCF 107 which is in charge of policy control.

The PCF 107 may determine policy, e.g., session management or mobility management, based on the packet flow-related information for ensuring QoS and transfer it to the AMF 103 or SMF 141, thereby enabling proper mobility management, session management, or QoS management. The reference point between the AF 146 and the PCF 107 is defined as N5.

The AUSF 109 stores data for authenticating the UE 101.

The UDM 106 stores the user's subscription data and policy data. The reference point between the AUSF 109 and the UDM 106 is defined as N13. The reference point between the AUSF 109 and the AMF 103 is defined as N12. The reference point between the UDM 106 and the AMF 103 is defined as N8. The reference point between the UDM 106 and the SMF 141 is defined as N10.

The CP functions may include various functions to control the network and UE. As two representative functions, the UE 101, the (R)AN 102, the UPF 142, the AMF 103, the AF 146, and the DN 145 in charge of mobility management functionality and the SMF 141 in charge of session management functionality are two independent functions and they are included in the CP functions.

In describing embodiments of the disclosure, the terms "slice," "service," "network slice," network service," "application slice," and "application service" may interchangeably be used.

The mobile communication service carrier may assign network resources suited for the corresponding service per slice or per set of a particular slice. The network resources may mean network functions (NFs) or logical resources or radio resource allocations provided by the network functions (NFs).

Network slicing is technology to allow for application of such properties as network isolation, customization, and independent management and orchestration to mobile communication core network architecture by bundling network resources and network functions into a single independent slice depending on the service.

Network slicing is a new concept for 5G core networks. Network slicing is technology which bundles network resources and network functions necessary for the service requested by the UE into a single independent slice.

By network slicing, the network service provider may make independent allocations of network resources specified for each service and user and secure the flexibility of network by software defined network (SDN) and network function virtualization (NFV)-based resource virtualization and hence expandability and reliability of service and network resource operation.

The public land mobile network (PLMN) may provide several network slices, and each network slice may be provided to the UE in the form of a slice instance. For example, the PLMN may include slice instance 1 110, slice instance 2 120, and slice instance 3 130.

The UE may access the network to receive a service from at least one of the several slice instances simultaneously or sequentially.

Each slice instance may include network resources necessary to provide the corresponding network slice. For example, slice instance 1 110 may include an SMF 111 and UPFs 112 and 113, slice instance 2 120 may include an SMF 121, a UPF 122, and a PCF 123, and slice instance 3 130 may include an SMF 131, a UPF 132, a PCF 133, and an NRF 134.

Referring to FIGS. 1A and 1B, the SMF 121 of slice instance 2 120 may be connected to a PCF 107 of PLMN level and the PCF 123 of slice level. The PCF 107 of PLMN level may manage policy information about the PLMN level and provide it to the SMF 121. The PCF 123 of slice level which belongs to slice instance 2 may manage the policy required to provide the corresponding slice and provide the corresponding information to the SMF 121.

Each slice may be identified with a slice identity (ID). As an example, the slice ID may be single-network slice selection assistance information (S-NSSAI) defined by the 3GPP.

Figure 2:
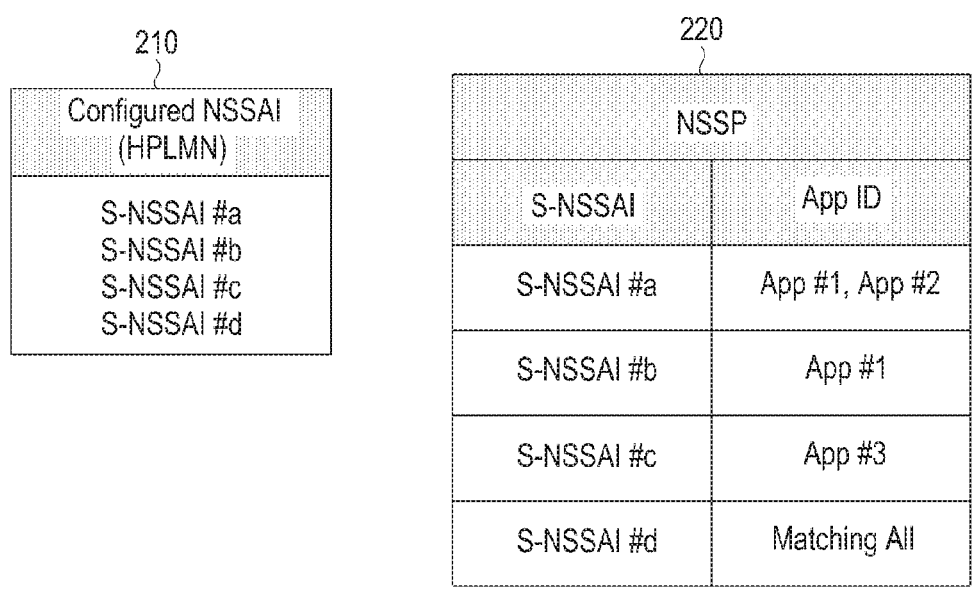
FIG. 2 illustrates network slice-related configuration information stored in a UE supporting 5G-based network slicing according to an embodiment of the disclosure.

FIG. 2 illustrates network slice-related configuration information stored in a UE 101 supporting 5G-based network slicing according to an embodiment of the disclosure. Referring to FIG. 2, the configuration information is described.

The UE 101 stores configuration information in a memory. The UE 101 may store configured network slice selection assistance information (NSSAI) 210 and network slice selection policy (NSSP)-related information 220.

The configured NSSAI 210 may be configured of an S-NSSAI list for network slices of subscription to the home PLMN (HPLMN) by the UE 101. The S-NSSAI list may include at least one S-NSSAI #id. For example, the S-NSSAI list may include S-NSSAI #a, S-NSSAI #b, S-NSSAI #c, and S-NSSAI #d.

Since the configured NSSAI is determined based on the UE's subscription information, the S-NSSAI constituting the configured NSSAI may differ per UE.

Since the configured NSSAI is determined based on the UE's subscription information, a change in the UE's subscription information may lead to a change in the configured NSSAI.

The S-NSSAI list of the UE's subscription which constitutes the configured NSSAI may be stored in the unified data management (UDM) which stores UE subscription information. The S-NSSAI of the UE's subscription stored in the UDM may be called 'subscribed S-NSSAI.'

The NSSP 220 represents mapping information between the UE-subscribed S-NSSAI (S-NSSAI #id) and the application which the corresponding S-NSSAI may support. One S-NSSAI #id may be mapped to at least one application. For example, S-NSSAI #a may be mapped to App #1 and App #2, S-NSSAI #b to App #1, S-NSSAI #c to App #3, and S-NSSAI # to all applications supportable.

The NSSP may be stored in the policy control function (PCF) storing UE and network-related policy information.

Or, the NSSP may be stored in the user data repository (UDR), and the PCF may, as necessary, send a request for NSSP information to the UDR and obtain the NSSP information from the UDR.

When the UE subscription information varies, a variation may be made to the UE subscribed S-NSSAI information stored in the UDM. When the UE subscription information varies, the NSSP information stored in the PCF or UDR may be varied.

If at least one of subscribed S-NSSAI or NSSP varies, the relevant configuration information stored in the UE need update.

Figure 3:
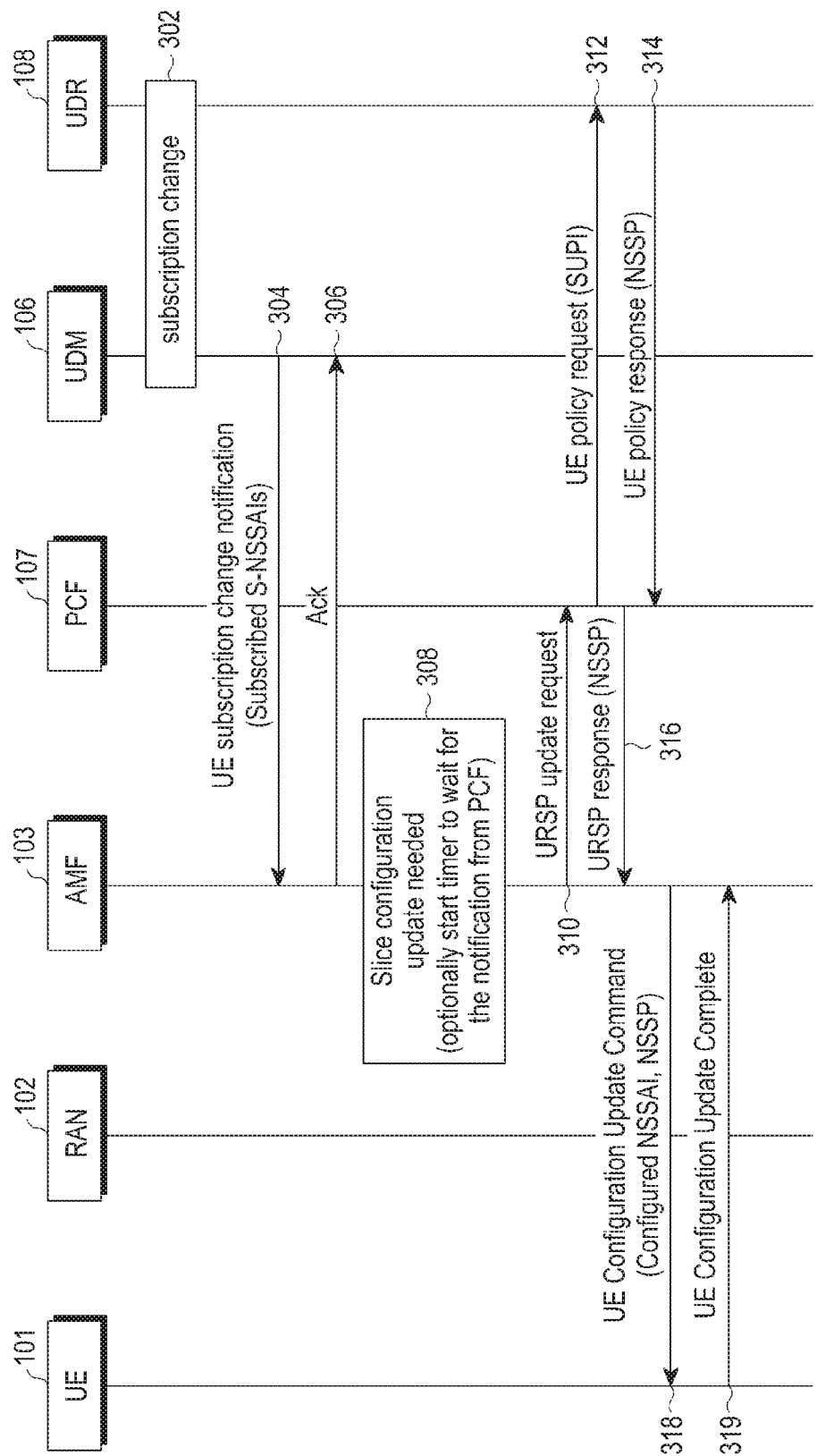
FIG. 3 illustrates a procedure of updating UE configuration information triggered by a UDM according to an embodiment of the disclosure.

FIG. 3 illustrates a procedure of updating configuration information stored in a UE according to an embodiment of the disclosure. A procedure of updating configuration information triggered not by a UE but by a network and stored in the UE is described below with reference to FIG. 3.

The configuration information stored in the UE 101 may include at least one of configured NSSAI or NSSP.

According to an embodiment, if the UE subscribed slice (e.g., subscribed S-NSSAI) is varied due to a change in UE subscription information (302), the UDM 106 storing the UE subscribed slice information may send a UE subscription change notification message to the AMF 103 (304).

The UE subscription change notification message may include changed subscribed S-NSSAI information.

According to an embodiment, the AMF 103 receives the changed subscribed S-NSSAI information. The AMF 103 may determine whether the configured NSSAI stored in the UE 101 need update and whether NSSP need update (308).

Unless other information related to the changed subscribed S-NSSAI information need update, operations 310, 312, 314, and 316 may be omitted, and the AMF 103 may transmit a UE configuration update message containing the configured NSSAI information to the UE 101 (318).

According to an embodiment, the AMF 103 may send a request for latest UE route selection policy (URSP) information to the PCF 107 (310).

Upon receiving the request from the AMF 103, the PCF 107 may send the latest URSP information to the AMF 103 (316). The URSP information may include the NSSP.

According to an embodiment, the PCF 107 may send a request for the UE's latest URSP information to the UDR 108 (312).

If the PCF 107 stores the latest URSP or latest NSSP information, operations 312 and 314 may be omitted.

The request message in operation 312 may contain a subscription permanent identifier (SUPI). The SUPI means the UE's identity (ID).

The UDR 108 may send the URSP information about the UE mapped with the SUPI information to the PCF 107 (314). The URSP information may include the NSSP.

According to an embodiment, the AMF 103 may receive the updated subscribed S-NSSAI from the UDM 106 and the updated NSSP from the PCF 107 and store them.

The AMF 103 may transmit a UE configuration update command message containing the updated subscribed S-NSSAI and updated NSSP information to the UE 101 (318).

The subscribed S-NSSAI contained in the UE configuration update command message may be called "configured NSSAI." The configured NSSAI may include all UE subscribed S-NSSAI or the modified S-NSSAI information alone.

The NSSP may include all the UE subscribed S-NSSAI and application ID information mapped thereto or only include mapping-changed S-NSSAI and the application ID mapped thereto.

According to an embodiment, upon receiving a UE subscription change notification message from the UDM 106, the AMF 103 may start a first timer and wait until it receives the latest NSSP information.

If the AMF 103 receives the latest NSSP information before the first timer expires, the AMF 103 sends a UE configuration update command message containing the updated configured NSSAI and the latest NSSP to the UE 101.

If the first timer expires, the AMF 103 sends a request message for the latest NSSP information to the PCF 107. If the first timer expires, the AMF 103 transmits a UE configuration update command message only containing the updated configured NSSAI to the UE 101.

Figure 4:
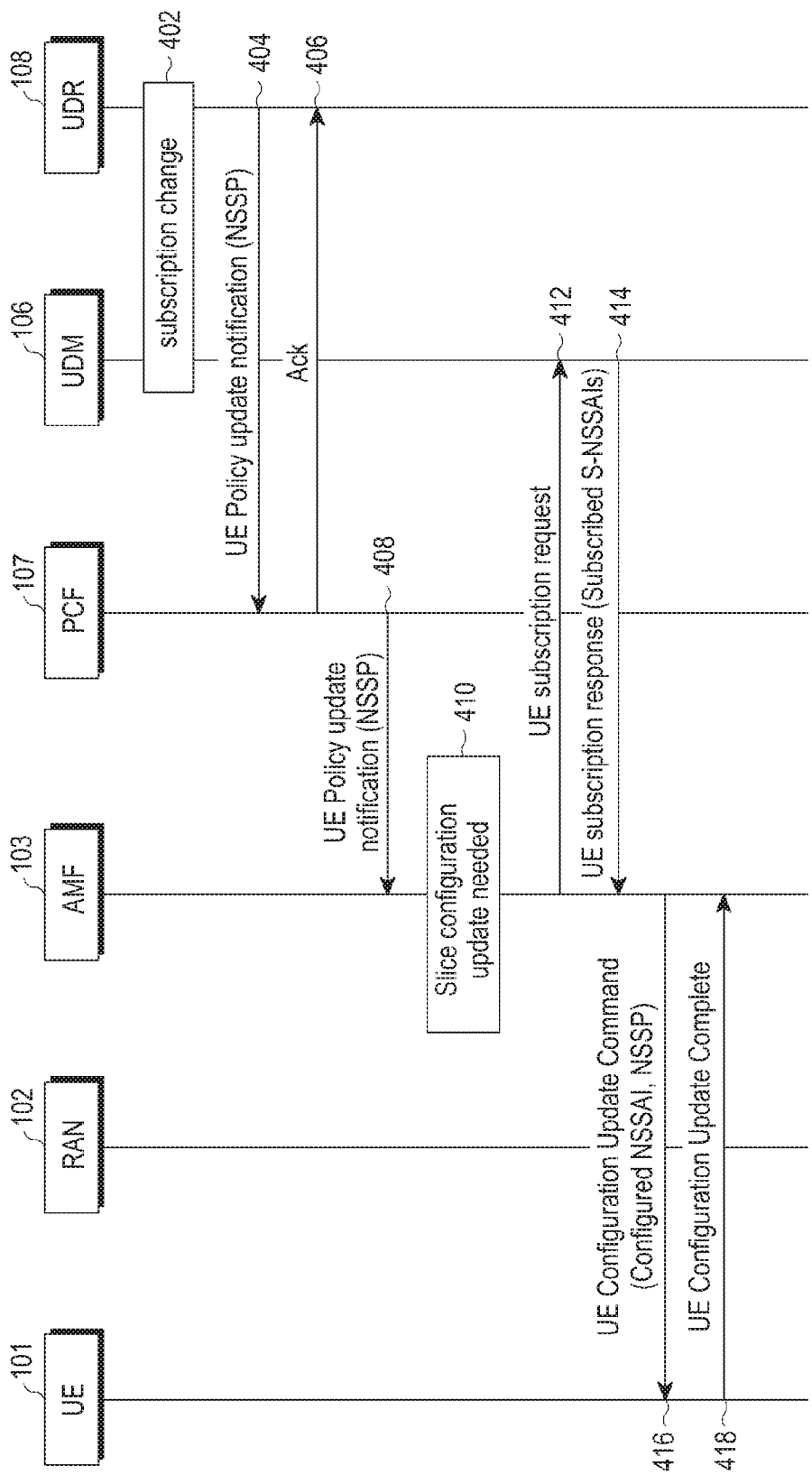
FIG. 4 illustrates a procedure of updating UE configuration information triggered by a UDR according to an embodiment of the disclosure.

FIG. 4 illustrates a procedure of updating configuration information stored in a UE according to an embodiment of the disclosure. A procedure of updating configuration information stored in a UE is described below with reference to FIG. 4.

According to an embodiment, the UE's network slice-related policy (NSSP) may be varied due to a change in the PLMN operator's policy or a change in UE subscription information (402).

If the NSSP is changed, the UDR 108 which stores the NSSP information may send a UE policy update notification message to the PCF 107 (404).

The UE policy update notification message may include changed NSSP information.

According to an embodiment, the PCF 107 may send a UE policy update notification message containing the changed UE policy information to the AMF 103 (408).

The UE policy update notification message may include a URSP and the URSP information may include the changed NSSP information.

According to an embodiment, the AMF 107 which has received the changed UE policy information from the PCF 107 may determine whether other UE configuration information related thereto also need update (410).

Unless the other information related to the UE policy information need update, operations 412 and 414 may be omitted, and the AMF 103 may transmit a UE configuration update message containing the UE policy information to the UE 101 (417).

When the other information related to the UE policy information need update, the AMF 103 may send a request for latest information to the relevant network function (NF).

For example, where, among the pieces of the changed NSSP information received from the PCF 107, the S-NSSAI field remains the same and only the App ID field value changes, the UE configured NSSAI may not require update. In contrast, when among the pieces of changed NSSP information received from the PCF 107, the S-NSSAI field value changes, the UE's configured NSSAI is required to be changed as well.

As such, when the configured NSSAI need update as well, the AMF 103 may send a request for the latest subscribed S-NSSAI information to the UDM 106 (412) and obtain the latest subscribed S-NSSAI from the UDM (414).

According to an embodiment, the AMF 103 may receive the updated subscribed S-NSSAI from the UDM 106 and the updated NSSP from the PCF 107 and store them. The AMF 103 may transmit a UE configuration update command message containing the updated subscribed S-NSSAI and updated NSSP information to the UE 101 (416).

The subscribed S-NSSAI contained in the message may be called 'configured NSSAI.' The configured NSSAI may include all UE subscribed S-NSSAI or the modified S-NSSAI information alone.

The NSSP may include all the UE subscribed S-NSSAI and application ID information mapped thereto or only include mapping-changed S-NSSAI and the application ID mapped thereto.

According to an embodiment, the AMF 103 receives any one of the changed subscribed S-NSSAI information or changed NSSP information.

The AMF 103 determines whether other configuration information not received need update for change. For example, when the changed NSSP is received, it determines whether the stored configured NSSAI need update and, when the changed subscribed S-NSSAI information is received, it determines whether the NSSP need update.

Examples of changes in the configuration information include the case where the UE moves, the case where the network policy changes, or the case where a subscriber data update notification is received from the UDM 106.

Upon determining that update is required, the AMF 103 sends a request for, and receives, configuration information not received. For example, when the stored configured NSSAI need update, the AMF sends a request for, and receives, updating of the changed configured NSSAI and, when the NSSP need update, the AMF sends a request for, and receives, the changed NSSP.

The AMF 103 stores the changed configured NSSAI and changed NSSP, which have been received.

The AMF 103 sends a UE configuration update command message to the UE 101. The UE configuration command message includes at least one of 5G-GUTI, TAI list, Allowed NSSAI, PLMN, Mapping of configured NSSAI, or Configuration Update indication. In particular, the UE configuration update command message includes the two pieces information, the updated subscribed S-NSSAI and the updated NSSP information.

Figure 5:
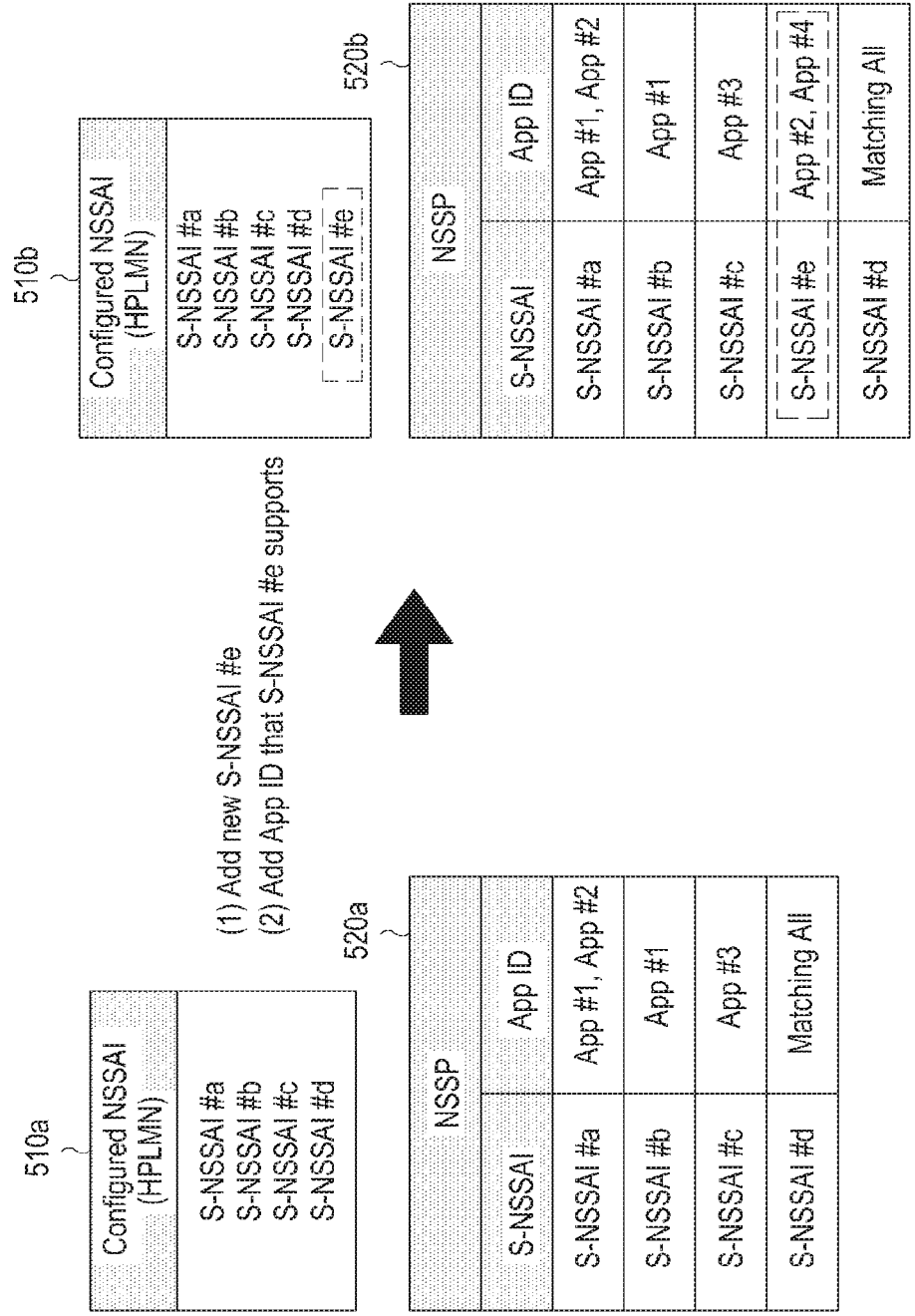
FIG. 5 illustrates a variation in configuration information stored in a UE due to addition of a new S-NSSAI according to an embodiment of the disclosure.
Figure 6:
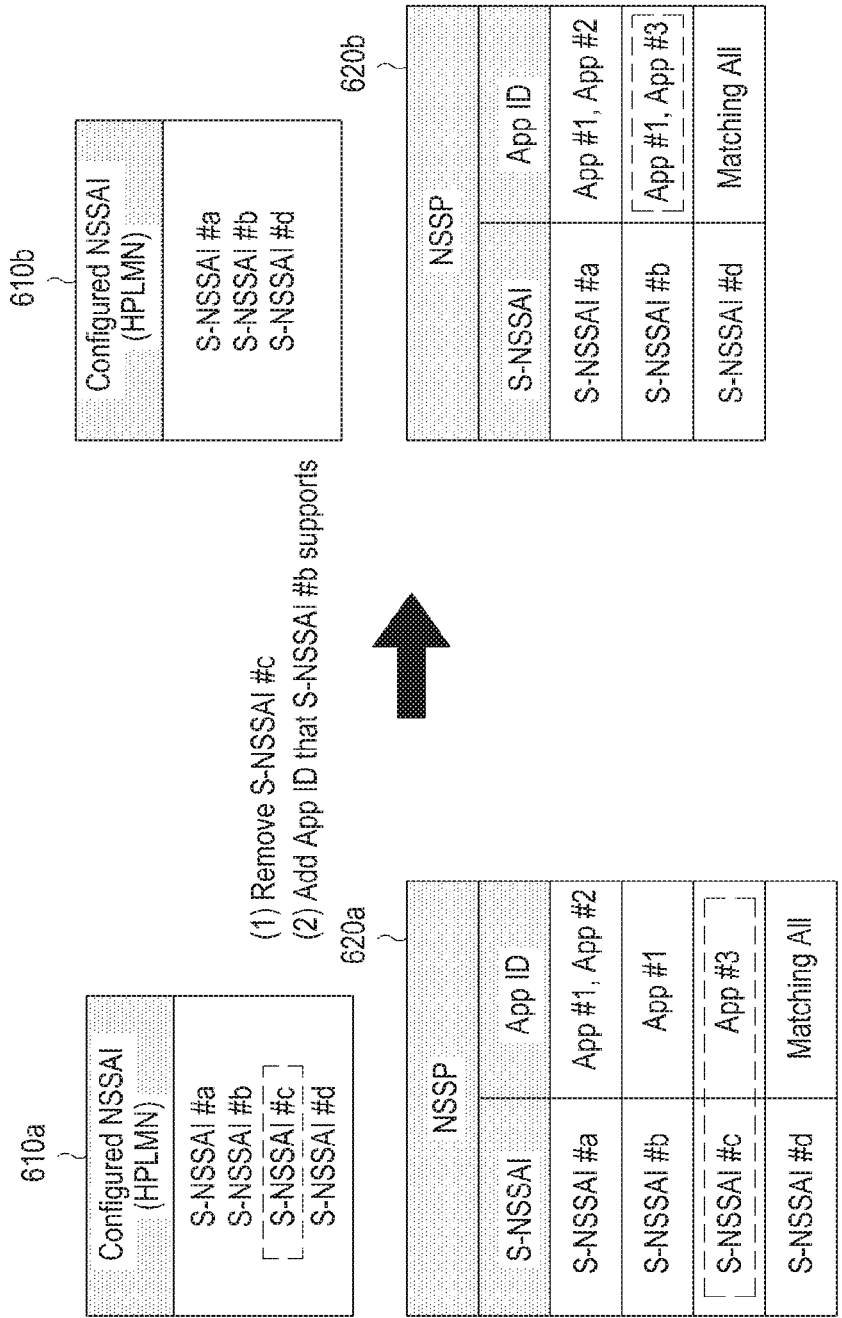
FIG. 6 illustrates a variation in configuration information stored in a UE due to deletion or release of an S-NSSAI according to an embodiment of the disclosure.
Figure 7:
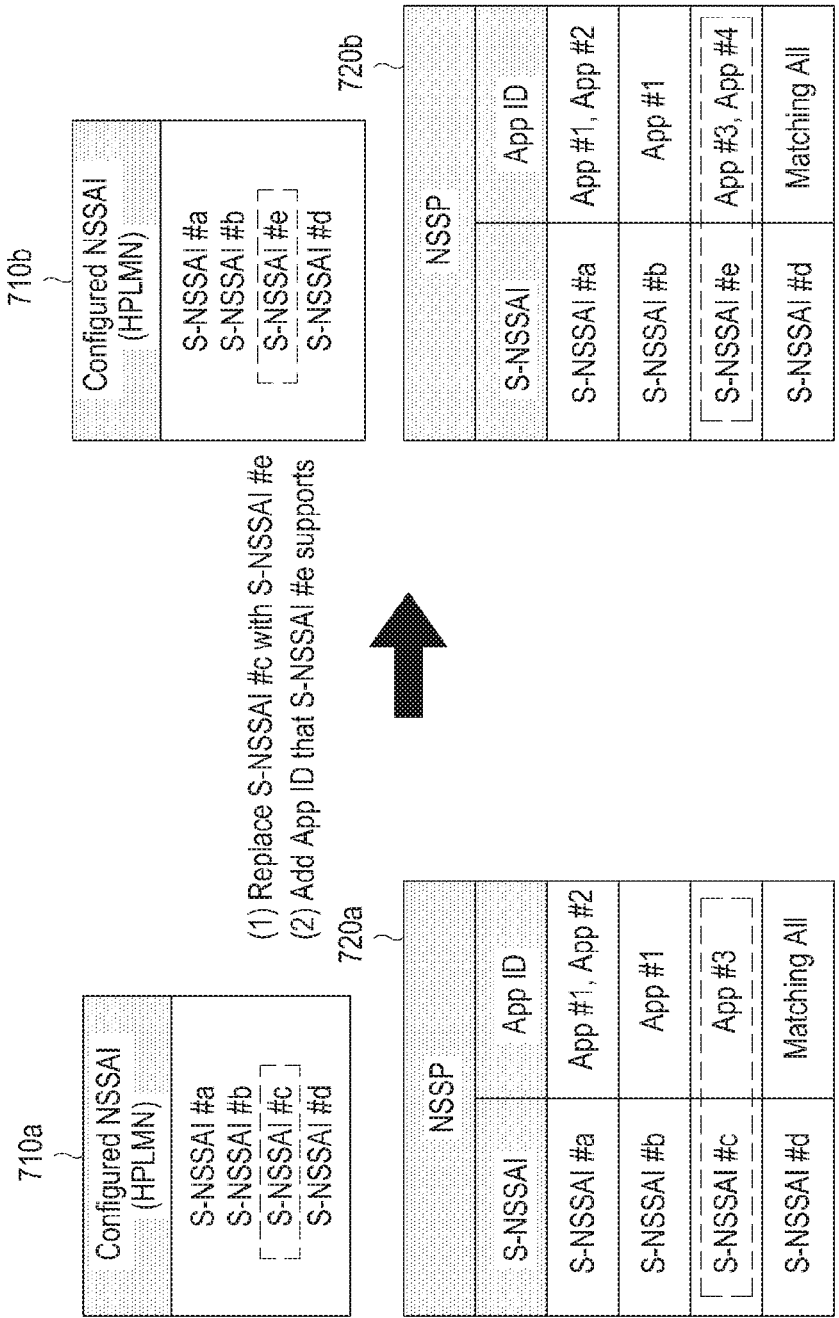
FIG. 7 illustrates a variation in configuration information stored in a UE due to replacement of an S-NSSAI according to an embodiment of the disclosure.

FIGS. 5 to 7 illustrate a change in configuration information stored in the UE which has received a UE configuration update command message. An adding, releasing, and replacing of configuration information are described below.

FIG. 5 illustrates a change (adding) in configuration information stored in the UE which has received a UE configuration update command message.

Referring to FIG. 5, preexisting configured NSSAI 510*a* and preexisting NSSP 520*a* denote preexisting configuration information, and new configured NSSAI 510*b* and new NSSP 520*b* denote information updated after receiving a UE configuration update command message.

The example shown in FIG. 5 may correspond to the case where the UE additionally subscribes to S-NSSAI #e. S-NSSAI #e is added to the configured NSSAI stored in the UE. S-NSSAI #e and application information (e.g., App #2 and App #4) mapped to S-NSSAI #e are added to the NSSP stored in the UE.

To update the UE configuration information as shown in FIG. 5, the message that the AMF sends to the UE may include both the new configured NSSAI 510*b* and new NSSP 520*b* information or only updated part, e.g., S-NSSAI #e and application ID (e.g., App #2 or App #4) mapped to S-NSSAI #e.

FIG. 6 illustrates a change (e.g., releasing) in configuration information stored in the UE which has received a UE configuration update command message.

Referring to FIG. 6, preexisting configured NSSAI 610a and preexisting NSSP 620a denote preexisting configuration information, and new configured NSSAI 610b and new NSSP 620b denote information updated after receiving a UE configuration update command message.

The example shown in FIG. 6 may correspond to the case where the UE releases its preexisting subscription to S-NSSAI #c. Or, it may correspond to the case where the mobile communication carrier stops serving the S-NSSAI #c network slice. S-NSSAI #c is deleted from the configured NSSAI stored in the UE.

S-NSSAI #c may be deleted from the configured NSSAI, but no change may be made to the NSSP information. Or, a change may be made to the NSSP information stored in the UE. For example, the mobile communication carrier's policy may be set to use App #3 which used to through S-NSSAI #c through S-NSSAI #b.

To update the UE configuration information as shown in FIG. 6, the message that the AMF sends to the UE may include both the new configured NSSAI 610b and, when a change is made to the NSSP information, the NSSP 620b information or only changed part, e.g., S-NSSAI #c and the changed NSSP information (application ID mapped to S-NSSAI #b).

FIG. 7 illustrates a change (e.g., replacing) in configuration information stored in the UE which has received a UE configuration update command message.

Referring to FIG. 7, preexisting configured NSSAI 710a and preexisting NSSP 720a denote preexisting configuration information, and new configured NSSAI 710b and new NSSP 720b denote information updated after receiving a UE configuration update command message.

The example shown in FIG. 7 may correspond to the case where the mobile communication carrier replaces the S-NSSAI #c network slice with S-NSSAI #e. S-NSSAI #c of the configured NSSAI stored in the UE is replaced with S-NSSAI #e. Further, S-NSSAI #c-related policy of the NSSP stored in the UE is changed into S-NSSAI #e-related policy.

To update the UE configuration information as shown in FIG. 7, the message that the AMF sends to the UE may include both the new configured NSSAI 710b and, when a change is made to the NSSP information, the new NSSP 720b information or only updated part, e.g., S-NSSAI #c and S-NSSAI #e of the configured NSSAI and, when a change is made to the NSSP information, the application ID (e.g., App #3 or App #4) mapped to the S-NSSAI.

Figure 8:
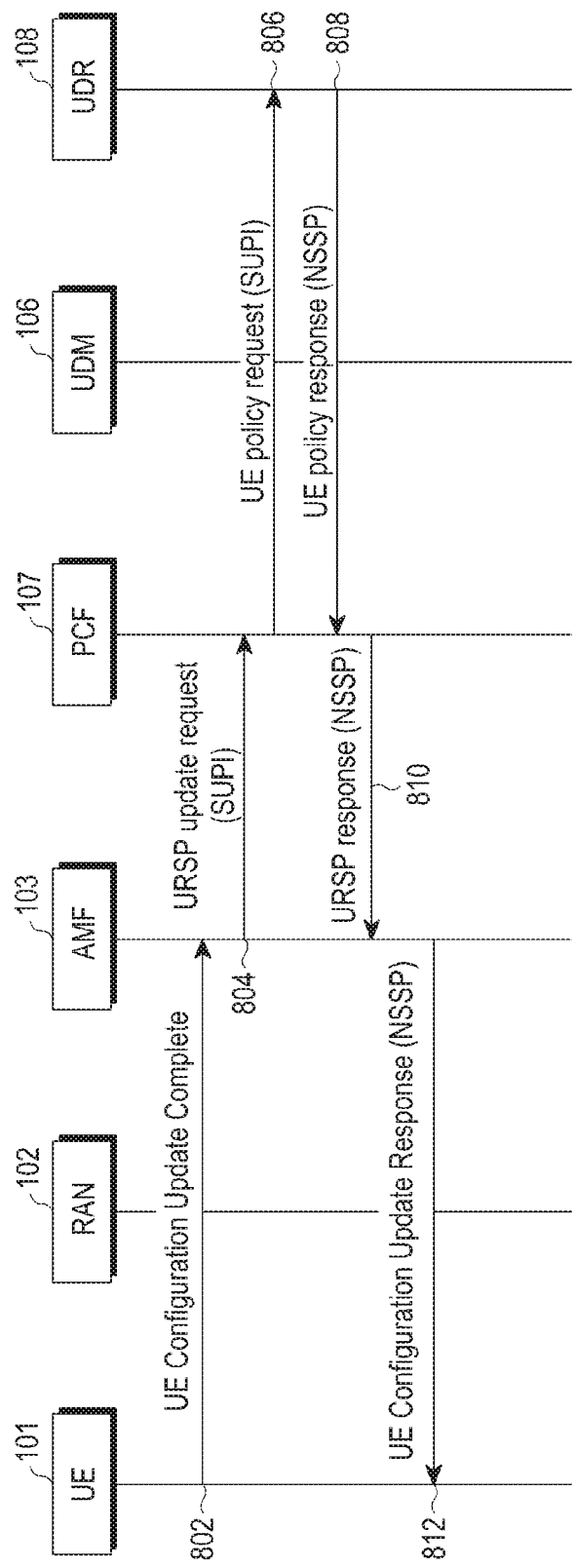
FIG. 8 illustrates a procedure of a UE sending a request for network slice policy (NSSP) information to a network according to an embodiment of the disclosure.

FIG. 8 illustrates a procedure of a UE sending a request for network slice policy (NSSP) information to a network according to an embodiment of the disclosure. A procedure in which, triggered by a UE, NSSP information is received by the UE is described below with reference to FIG. 8.

Referring to FIG. 8, the UE 101 stores configured NSSAI and NSSP information to support network slicing.

The UE 101 may receive subscribed S-NSSAI from the AMF and update the configured NSSAI with the subscribed S-NSSAI newly received.

Unless the S-NSSAI contained in the configured NSSAI is included in the NSSP, the UE 101 may send a request (UE configuration update request) for latest NSSP information through a first request message to the network (802). The first request message may include version information about the NSSP currently stored in the UE 101. The first request message may be transmitted to the AMF 103.

Upon receiving the first request message, the AMF 103 may send a request (URSP update request) for the UE's latest NSSP information to the PCF 107 through a second request message (804). The second request message may include a SUPI which is an ID for identifying the UE 101. The second request message may also include NSSP version information received from the UE 101. The second request message may be transmitted to the PCF 107.

Upon receiving the second request message, the PCF 107 may send a request (UE policy request) for the UE's latest URSP information to the UDR 108 through a third request message (806).

If the PCF 107 stores the latest URSP or latest NSSP information, operations 806 and 808 may be omitted.

The third request message may include a SUPI which is an ID for identifying the UE 101.

The UDR 108 may transmit a UE policy response containing the UE's URSP information mapped with the SUPI information to the PCF 107 through a third response message (808).

The URSP information may include the latest NSSP. The third response message may include the URSP or latest NSSP version information.

The PCF 107 may compare the NSSP version information received from the UE 101 with the latest NSSP or URSP version information received from the UDR and, unless the NSSP version received from the UE 101 is not the latest version, transfer the latest NSSP information to the UE 101.

The PCF 107 may send a response of the latest NSSP information to the AMF 103 through a second response message (810).

Upon receiving the second response message, the AMF 103 may transfer the latest NSSP information to the UE 101 through the third response message (812).

The UE 101 updates configuration information stored in the UE 101 using the latest NSSP information received from AMF 103.

Figure 9A:
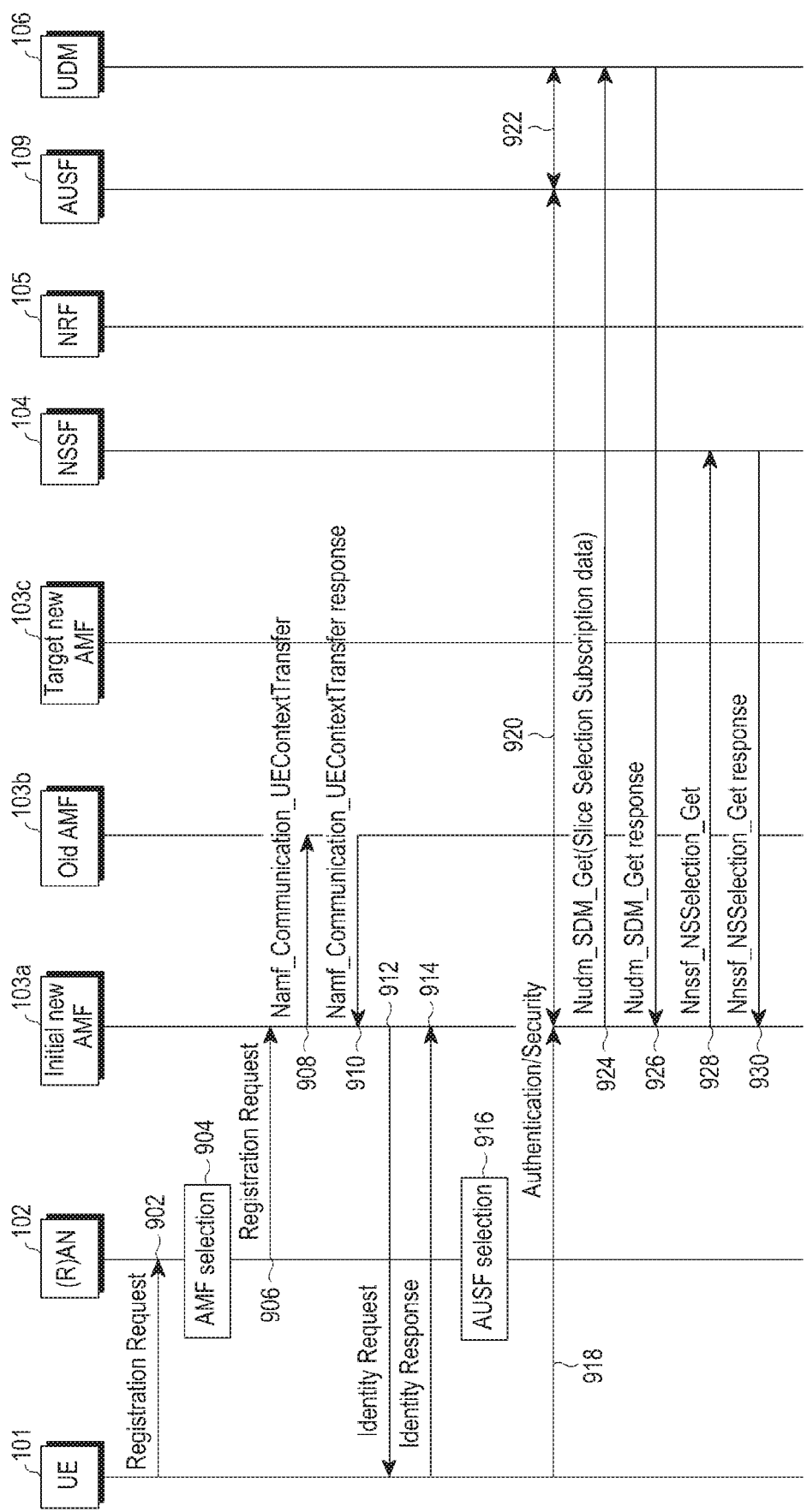
FIGS. 9A and 9B illustrate an operational procedure in a network when a UE sends out a registration request message according to an embodiment of the disclosure.
Figure 9B:
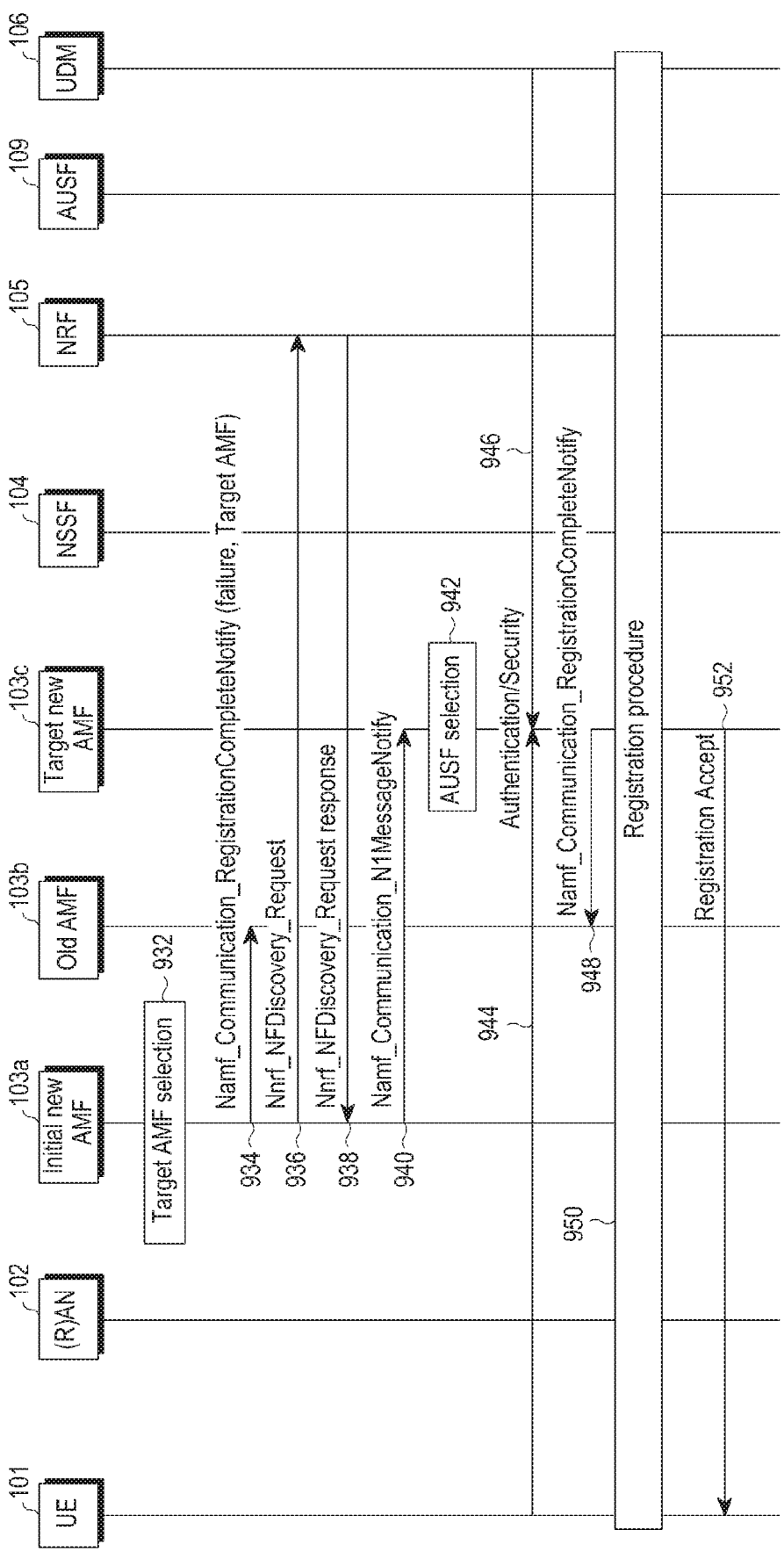

FIGS. 9A and 9B illustrate an operational procedure in a network when a UE sends out a registration request message according to an embodiment of the disclosure. Operations of a network when a UE sends a registration request message are described below with reference to FIGS. 9A and 9B.

When the UE 101 initially attaches to the network, when the UE 101 moves to a new registration area, or when the UE's registration timer expires, the UE 101 transmits a registration request message to the network (902).

If the UE 101 sends the registration request message (902), the (R)AN 102 selects an AMF which may provide the request network slice based on the request network slice (requested NSSAI) information contained in the UE's registration request message (904). The (R)AN 102 may transmit the registration request message to the initial new AMF 103a (906).

Upon receiving the registration request message, the initial new AMF 103a may send a request for UE context information to an old AMF 103b associated with the 5G globally unique temporary identifier (5G-GUTI) of the UE contained in the registration request message (908).

The old AMF 103b may receive the registration request message and, in response, send the stored UE context information to the initial new AMF 103a (910).

The initial new AMF 103a may send a request for the UE's subscription information to the UDM 106 (924). The UDM 106 may receive the UE's subscription information request message and, in response, send the UE subscribed S-NSSAI information to the initial new AMF 103a (926).

The initial new AMF 103a may perform authentication as to whether it is qualified to use the S-NSSAI contained in the UE-requested NSSAI based on the subscribed S-NSSAI received from the UDM 106.

The initial new AMF 103*a* may determine whether the initial new AMF 103*a* may provide the S-NSSAI which is available to the UE 101. Unless the initial new AMF 103*a* may provide the S-NSSAI, the initial new AMF 103*a* may transmit a network slice selection (NS Selection get) message to the NSSF 104 (928). The network slice selection message may include at least one of the UE requested NSSAI information or the subscribed S-NSSAI information received from the UDM 106.

Upon receiving the network slice selection request message, the NSSF 104 may determine the network slice (allowed NSSAI) available to the UE 101 based on the subscribed S-NSSAI and the UE requested NSSAI. The allowed NSSAI is configured of an S-NSSAI list available to the UE 101. The NSSF 104 may, in response, send list information about the AMFs which may provide the allowed NSSAI to the initial new AMF 103*a* (930).

The initial new AMF 103*a* may identify that the initial new AMF 103*a* is not on the AMF list received from the NSSF and select one AMF from the AMF list received from the NSSF (932). The AMF selected by the initial new AMF 103*a* may be denoted a target new AMF 103*c*.

The initial new AMF 103*a* may notify the old AMF 103*b* that the registration procedure is incomplete through a Namf_Communication_Registration Complete Notify message (934). The Namf_Communication_Registration Complete Notify message may contain at least one of reject-related information or information about the target new AMF 103*c* to which the registration request message is to be delivered.

Upon receiving the Namf_Communication_Registration Complete Notify message, the old AMF 103*b* may be aware that the registration procedure is incomplete and keep retaining, without deleting, the UE context stored in the old AMF 103*b*.

The initial new AMF 103*a* may transfer the registration request message received from the UE 101 to the selected target new AMF 103*c* (940). The registration request message may contain UE context information received by the initial new AMF 103*a* from the old AMF 103*b*. The registration request message may include at least one of the UE's SUPI or MM context information.

Upon receiving the message, the target new AMF 103*c* may notify the old AMF 103*b* associated with the UE's 5G-GUTI that the registration procedure has been complete (948).

Upon receiving the registration procedure complete message, the old AMF 103*b* may compare the information about the target new AMF 103*c*, which has transmitted the message, with the AMF address received from the initial new AMF 103*a* in operation 840 and, when the two pieces of information match, process the received notification message and delete the UE context stored in the old AMF 103*b*.

The target new AMF 103*c* may process the UE registration request message and notify the UE 101 that the registration procedure is complete (952). The registration procedure complete message may contain network slice information (allowed NSSAI) available to the UE 101.

Figure 10:
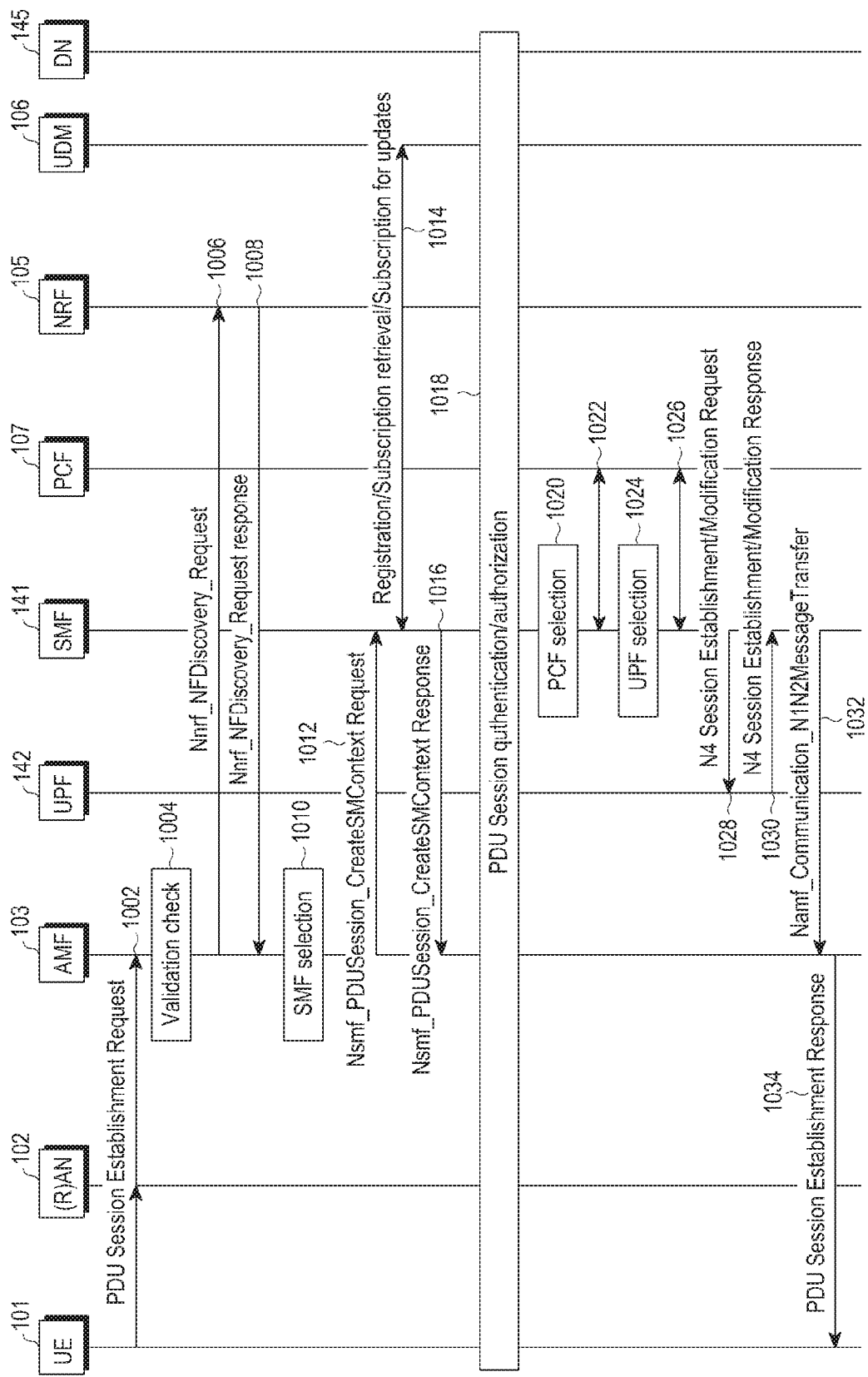
FIG. 10 illustrates a PDU session establishing procedure according to an embodiment of the disclosure.

FIG. 10 illustrates a PDU session establishing procedure according to an embodiment of the disclosure. A PDU session establishing procedure is described below with reference to FIG. 10.

When the UE 101 completes registration in the network, the UE 101 receives a registration complete message. The registration complete message may contain network slice information (allowed NSSAI) available to the UE 101. The allowed NSSAI is configured of an S-NSSAI list available to the UE 101.

The UE 101 may perform a registration procedure independently per attached network and, thus, obtain allowed NSSAI per attached network.

The UE 101 attached via a 3GPP radio access network (RAN) may obtain allowed NSSAI which is an available S-NSSAI set via the 3GPP RAN. When the UE 101 attaches via a non-3GPP access network (AN), e.g., Wi-Fi, the UE may obtain allowed NSSAI which is an available S-NSSAI set via the non-3GPP AN.

For example, the UE 101 may obtain the allowed NSSAI from the AMF 103 and store the allowed NSSAI in its memory. The allowed NSSAI may be stored along with the S-NSSAI list of the configured NSSAI shown in FIG. 2. S-NSSAI #a, S-NSSAI #b, and S-NSSAI #c are information related to the network slice attachable via the 3GPP RAN (e.g., a 5G base station), and S-NSSAI #d is information related to the network slice attachable via the non-3GPP access network (AN) (e.g., Wi-Fi).

When the UE 101 simultaneously attaches to the network via the RAN and the AN, the UE 101 may simultaneously have two pieces of allowed NSSAI, i.e., first allowed NSSAI available in the RAN 102 and second allowed NSSAI available in the AN. The first allowed NSSAI available in the RAN 102 and the second allowed NSSAI available in the AN may include the same or different S-NSSAI.

Further, the AMF 103 to which the UE 101 attaches may store the allowed NSSAI information, which is transmitted to the UE 101 during the registration procedure, in the memory of the AMF 103. When the UE 101 may simultaneously attach to the RAN and the AN, the AMF may store both the first allowed NSSAI available in the RAN and the second allowed NSSAI available in the AN in the memory of the AMF.

When registration is complete by the above procedure, the UE 101 may establish a session and attach to the data network (DN) 145, thereby receiving a service.

According to an embodiment, the UE 101 may send a PDU session establishment request message to the network to attach to the DN 145 and use a service (1002).

The session establishment message may contain S-NSSAI mapped to the service which the UE intends to use.

The mapping relationship between the service (application) and the S-NSSAI is shown in the NSSP of FIG. 2. For example, the UE 101 which desires to use App #3 may identify the NSSP information stored in the UE 101 to thereby identify that the slice ID mapped with APP #3 is S-NSSAI #c and that S-NSSAI #c is contained in the allowed NSSAI available in the UE's currently attached network and may transmit a session request message containing S-NSSAI #c.

The AMF 103 may receive the session establishment request message from the UE 101 (1002).

The AMF 103 may determine whether the S-NSSAI contained in the session establishment request message is the slice ID available in the network to which the UE 101 currently attaches based on the allowed NSSAI information stored during the UE registration procedure (1004).

The session establishment request message is transferred to the AMF 103 via the network (3GPP RAN or non-3GPP AN) 102 to which the UE 101 attaches.

The AMF 103 may identify what network (3GPP RAN or non-3GPP AN) the UE 101 is attached by looking to the N2 ID between the AMF 103 and the attached network (3GPP RAN or non-3GPP AN).

The AMF 103 may determine the validity of the S-NSSAI contained in the session request message based on at least one of the allowed NSSAI stored in the memory of the AMF 103, information about the attached network that may use the allowed NSSAI, or the N2 ID between the AMF 103 and the attached network transferring the session establishment request message (1004).

When the S-NSSAI contained in the session request message is invalid in the validity determination process (1004), the AMF 103 may reject the session establishment request message which the UE 101 has sent out.

The AMF 103 may transmit a PDU session establishment response message containing a value indicating the reason for rejection of the session establishment request from the UE 101 to the UE (1034). In this case, operations 1006 to 1032 may be omitted. Selectively, the AMF 103 may transmit a reject message containing the available (allowed) S-NSSAI information to the UE 101.

For example, it is assumed that the same allowed NSSAI as the configured NSSAI stored in the UE 101 is stored in the memory of the AMF 103 as shown in FIG. 2. The UE 101 sends a session request to S-NSSAI #j which is not included in the allowed NSSAI. The AMF 103 examines the UE's session request and determines that S-NSSAI #j is invalid since S-NSSAI #j is not included in the AMF's allowed NSSAI. The AMF 103 skips operations 1006 to 1032 which are relevant to session establishment and sends a response message to reject the session establishment request to the UE 101.

The UE 101 selects S-NSSAI within the configured NSSAI storing the allowed NSSAI received from the network and sends a request for session establishment to the network. However, such an erroneous scenario case may arise when the UE 101 sends a session establishment request to the network for the S-NSSAI not included in the connector or for the S-NSSAI only included in the configured NSSAI but not in the allowed NSSAI. The disclosure may include the process of the AMF 103 investigating the validity of the S-NSSAI to avoid such erroneous cases.

Or, when the UE 101 attaches to a network, e.g., a 3GPP RAN, if the UE 101 sends a session establishment request message of S-NSSAI related to a network, e.g., a non-3GPP AN, to the AMF 103, the AMF 103 sends a response message to reject the session establishment request to the UE 101. The AMF 103 may send a rejection message to the UE 101 in response to the session establishment request of S-NSSAI related to a network different from the UE-attached network.

When the S-NSSAI contained in the session request message is valid in the validity determination procedure 904, the AMF 103 may send a network function (NF) discovery request message to the NRF 144 to discover the SMF capable of providing the S-NSSAI that the UE 101 has requested (1006).

The NF discovery request message may include at least one of the S-NSSAI requested by the UE 101 or attached network type (access type) information (e.g., 3GPP RAN, non-3GPP AN, or Wi-Fi) about the network to which the UE 101 is currently attaching.

Upon receiving the NF discovery request message, the NRF 144 may discover SMF information that may support the S-NSSAI requested by the attached network and included in the request message.

In response, the NRF 144 may send an NF discovery request response message containing the discovered SMF information to the AMF 103 (1008).

When the UE-attached network includes a plurality of SMFs that may support the UE-requested S-NSSAI, the NF discovery request response message may include a list of the plurality of SMFs.

Further, the NF discovery request response message may contain S-NSSAI information that each SMF may support. Further, the NF discovery request response message may contain attached network type (access type) information that each SMF may support.

Upon receiving the NF discovery request response message, the AMF 103 may select one SMF from the SMF list contained in the response message (1010).

When the NF discovery request response message also includes the S-NSSAI information that each SMF may support, the AMF 103 may select an SMF based on the S-NSSAI that each SMF may support.

When the NF discovery request response message also includes the attached network type information that each SMF may support, the AMF 103 may select an SMF based on the attached network type information that each SMF may support.

The AMF 103 may transmit a session creation request message (Nsmf_PDUSession_CreateSMContext) to the selected SMF 141 (1012). Completing the session establishment through operations 1012 to 1032, the AMF 103 may transmit a PDU session establishment response message to the UE 101 to indicate that session establishment has been complete (1034).

When the S-NSSAI contained in the session request message is invalid in the validity determination process (1004), the AMF 103 may use the default S-NSSAI value instead of the S-NSSAI that the UE 101 has requested. The default S-NSSAI may be a value stored in the SMF or a value obtained by the SMF from the UDM.

The AMF 103 may send a network function (NF) discovery request message to the NRF 144 to discover the SMF capable of providing the default S-NSSAI (1006). The NF discovery request message may include at least one of the default S-NSSAI or attached network type (access type) information (e.g., 3GPP RAN, non-3GPP AN, or Wi-Fi) about the network to which the UE is currently attaching.

The subsequent operations are the same as in the above-described case where the S-NSSAI contained in the session request message is valid in the validity determination procedure 1004 except that the default S-NSSAI selected by the AMF 103 is used instead of the US-requested S-NSSAI.

Figure 11:
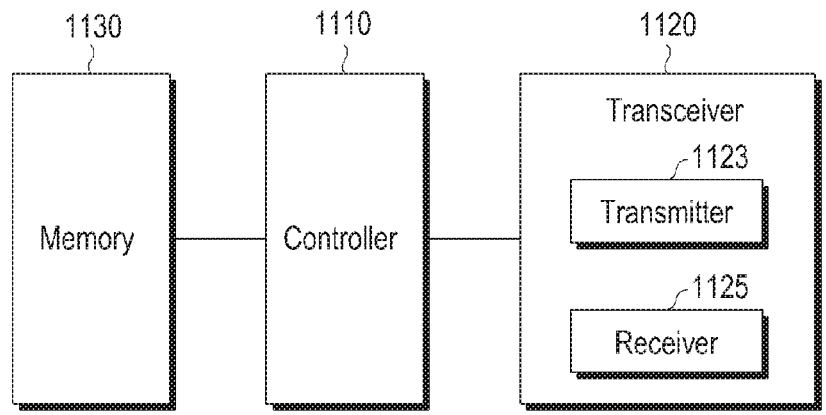
FIG. 11 illustrates a configuration of a UE according to an embodiment of the disclosure.

FIG. 11 illustrates a structure of a UE according to an embodiment of the disclosure.

According to an embodiment, a UE may include a transceiver 1120, a controller 1110 (e.g., including at least one processor) controlling the overall operation of the transceiver 1120 and the UE, and a memory 1130.

The transceiver 1120 may include a transmitter 1123 and a receiver 1125. The transceiver 1120 may transmit and receive signals to/from other network entities.

The controller 1110 may control the UE to perform the above-described operations of the disclosure. Meanwhile, the controller 1110 and the transceiver 1120 are not necessarily implemented in separate modules but rather in a single module, e.g., in the form of a single chip.

The controller 1110 and the transceiver 1120 may be electrically connected with each other. For example, the controller 1110 may be a circuit, an application-specific circuit, or at least one processor. The operations of the UE may be implemented by providing the memory 1130 storing a corresponding program code in any component of the UE.

The memory 1130 stores UE configuration information and is controlled by the controller 1110.

Figure 12:
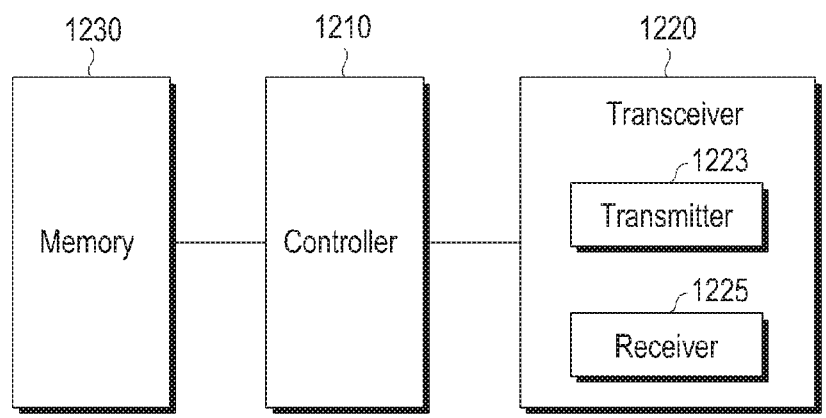
FIG. 12 illustrates a configuration of a network entity according to an embodiment of the disclosure.

FIG. 12 illustrates a configuration of a network entity according to an embodiment of the disclosure. For example, the network entity may includes at least one of the (R)AN 102, the DN 145, or the plurality of NFs inside the CN.

According to an embodiment, a network entity may include a transceiver 1220, a controller 1210 (e.g., including at least one processor) controlling the overall operation of the transceiver 1220 and the network entity, and a memory 1230.

The transceiver 1120 may include a transmitter 1223 and a receiver 1225. The transceiver 1220 may transmit and receive signals to/from other network entities.

The controller 1210 may control the network entity to perform the above-described operations of the embodiments.

Meanwhile, the controller 1210 and the transceiver 1220 are not necessarily implemented in separate modules but rather in a single module, e.g., in the form of a single chip.

The controller 1210 and the transceiver 1220 may be electrically connected with each other. For example, the controller 1210 may be a circuit, an application-specific circuit, or at least one processor. The operations of the network entity may be implemented by providing the memory 1230 storing a corresponding program code in any component of the network entity. The memory 1230 stores UE-related configuration information and is controlled by the controller 1210.

Figure 13:
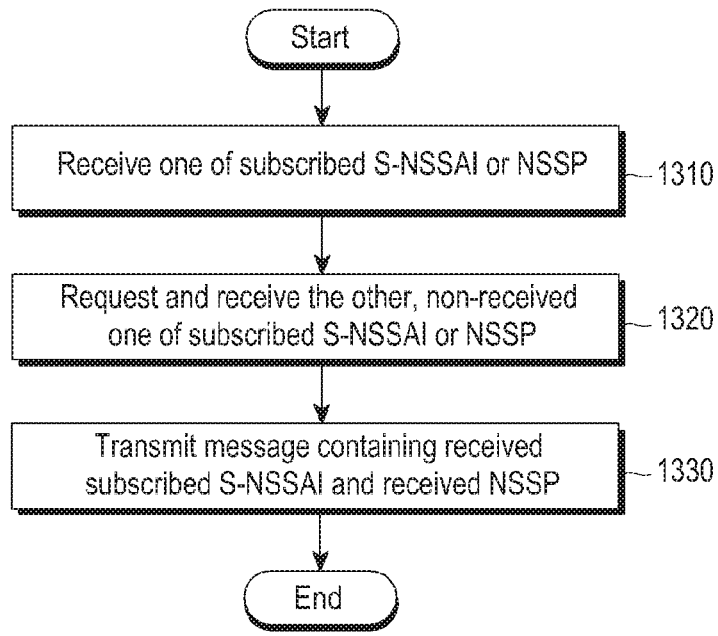
FIG. 13 illustrates a flowchart of updating UE configuration information by a network according to an embodiment of the disclosure.

FIG. 13 illustrates a flowchart of updating UE configuration information by a network according to an embodiment of the disclosure.

Referring to FIG. 13, according to an embodiment of the disclosure, there may be provided a communication method using a network slice by an access and mobility management function (AMF) comprises receiving one of subscribed single-network slice selection assistance information (S-NSSAI) or network slice selection policy (NSSP) information (1310), requesting and receiving the other, non-received information of the subscribed S-NSSAI or the NSSP information (1320), and transmitting a first message including the received subscribed S-NSSAI and the received NSSP information to a user equipment (UE) (1330).

Figure 14:
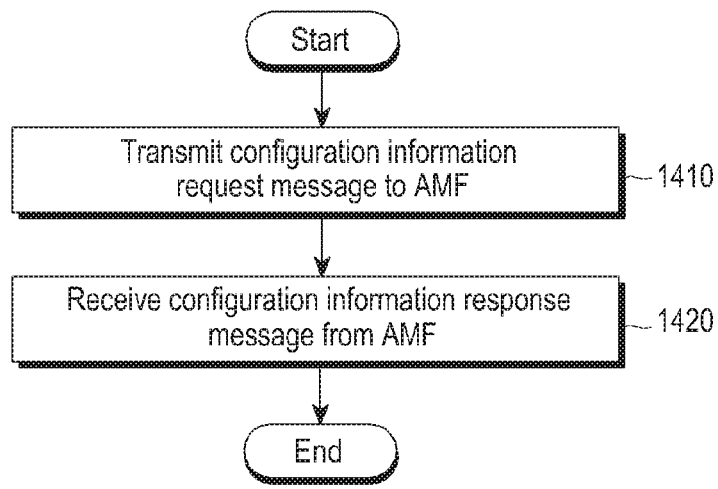
FIG. 14 illustrates a flowchart of updating UE configuration information by a UE according to an embodiment of the disclosure.

FIG. 14 illustrates a flowchart of updating UE configuration information by a UE according to an embodiment of the disclosure.

Referring to FIG. 14, according to an embodiment of the disclosure, there may be provided a communication method using a network slice by a UE, comprising, when first S-NSSAI is included in configured S-NSSAI and is not included in NSSP information, transmitting a configuration information request message related to the first S-NSSAI to an AMF (1410) and receiving a configuration information response message related to the first S-NSSAI from the AMF (1420).

Figure 15:
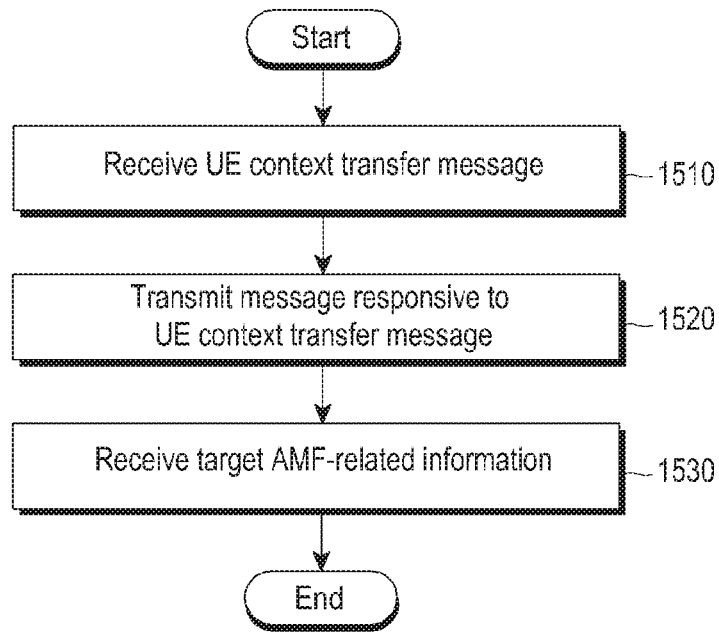
FIG. 15 illustrates a flowchart of operations in a network when a UE sends out a registration request message according to an embodiment of the disclosure.

FIG. 15 illustrates a flowchart of operations in a network when a UE sends out a registration request message according to an embodiment of the disclosure.

Referring to FIG. 15, according to an embodiment of the disclosure, there may be provided a communication method using a network slice by a first AMF, comprising receiving a UE context transfer message from a second AMF (1510), transmitting a message responsive to the UE context transfer message to the second AMF (1520) and receiving registration rejection-related information and target AMF-related information from the second AMF (1530).

Figure 16:
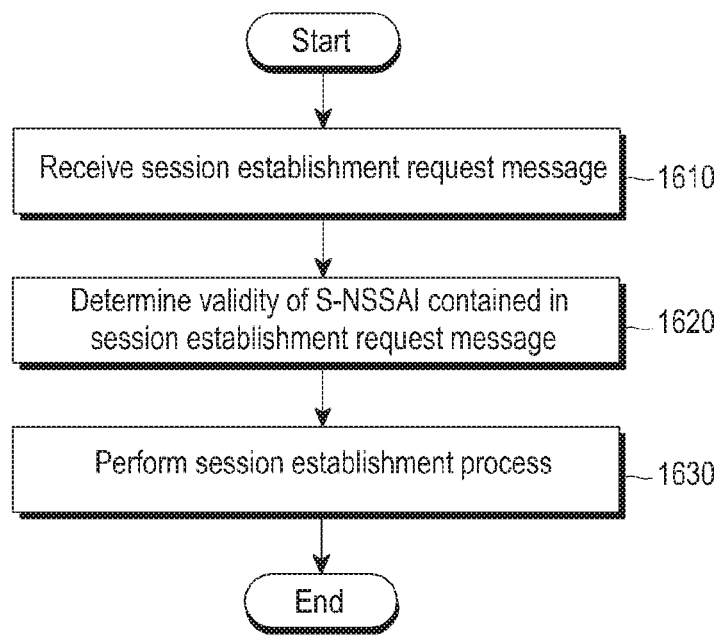
FIG. 16 illustrates a flowchart of establishing a PDU session according to an embodiment of the disclosure.

FIG. 16 illustrates a flowchart of establishing a PDU session according to an embodiment of the disclosure.

Referring to FIG. 16, according to an embodiment of the disclosure, there may be provided a communication method using a network slice by an AMF, comprising receiving a session establishment request message including S-NSSAI from a UE (1610), determining validity of the S-NSSAI (1620), and performing a session establishment process based on a result of the determination (1630).

As is apparent from the foregoing description, according to the disclosure, a UE may efficiently receive updated configuration information from a 5G network. The 5G network may have a diversity of configuration information related to the UE. When each piece of configuration information varies, the 5G network may transfer the varied information to the UE.

According to embodiments of the disclosure, when a plurality of pieces of configuration information associated with each other are updated, the 5G network may simultaneously transfer the updated pieces of information to the UE. Thus, signaling messages between the UE and the network may be reduced.

According to the disclosure, the 5G network may efficiently configure a network function (NF) which meets the service requested by the UE. The 5G network may select NFs capable of providing the service which the UE requests and configure a network slice. At this time, the first NF selected may be changed into a different NF, and information exchange may occur between the NFs.

According to embodiments of the disclosure, signaling messages between the NFs may be reduced by optimizing information exchange between the NFs.

According to the disclosure, the 5G network may efficiently manage the session that the UE requests. The 5G network may select NFs capable of providing the service which the UE requests and configure a network slice.

According to embodiments of the disclosure, parameters necessary for the 5G network to select an NF and procedures related thereto are defined.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE), the method comprising:
    determining whether at least one single-network slice selection assistance information (S-NSSAI) in configured NSSAI stored in the UE is included in network slice selection policy (NSSP) information stored in the UE;
    transmitting, to an access and mobility management function (AMF), a policy provisioning request message including the NSSP information in response to the at least one S-NSSAI in the configured NSSAI being not included in the NSSP information;
    receiving, from the AMF, a response message including updated NSSP information as a response to the policy provisioning request message; and updating a policy of the UE based on the updated NSSP information included in the response message, wherein an update request message including the NSSP information is from the AMF to a policy control function (PCF) in response to the policy provisioning request message.

2. The method of claim 1, wherein the updated NSSP information included in the response message is obtained from the PCF.

3. A user equipment (UE), the UE comprising:
a transceiver; and
at least one processor coupled with the transceiver, the at least one processor configured to:
determine whether at least one single-network slice selection assistance information (S-NSSAI) in configured NSSAI stored in the UE is included in network slice selection policy (NSSP) information stored in the UE;
transmit, to an access and mobility management function (AMF), a policy provisioning request message including the NSSP information in response to the at least one S-NSSAI in the configured NSSAI being not included in the NSSP information;
receive, from the AMF, a response message including updated NSSP information as a response to the policy provisioning request message; and
update a policy of the UE based on the updated NSSP information included in the response message,
wherein an update request message including the NSSP information is from the AMF to a policy control function (PCF) in response to the policy provisioning request message.

4. The UE of claim 3, wherein the updated NSSP information included in the response message is obtained from the PCF.

* * * * *